(12) United States Patent
Suzuki et al.

(10) Patent No.: US 7,443,868 B2
(45) Date of Patent: Oct. 28, 2008

(54) MODULAR TYPE NODE APPARATUS FOR PACKET COMMUNICATION

(75) Inventors: Toshiaki Suzuki, Kunitachi (JP); Kunihiko Toumura, Hachioji (JP); Hideki Okita, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 665 days.

(21) Appl. No.: 11/167,312

(22) Filed: Jun. 28, 2005

(65) Prior Publication Data

US 2006/0002298 A1    Jan. 5, 2006

(30) Foreign Application Priority Data

Jul. 1, 2004    (JP)    ............... 2004-195467

(51) Int. Cl.
*H04L 12/28*    (2006.01)
(52) U.S. Cl. ...................... 370/401; 709/238
(58) Field of Classification Search ........... 370/401, 370/395.2; 709/238
See application file for complete search history.

(56) References Cited

U.S. PATENT DOCUMENTS

| | | | | |
|---|---|---|---|---|
| 5,634,043 | A | * | 5/1997 | Self et al. .................. 713/503 |
| 6,175,867 | B1 | * | 1/2001 | Taghadoss ................. 709/223 |
| 7,380,011 | B2 | * | 5/2008 | Li et al. .................... 709/227 |
| 2005/0169276 | A1 | * | 8/2005 | Monette et al. ............ 370/392 |

FOREIGN PATENT DOCUMENTS

| | | |
|---|---|---|
| JP | 2000-132487 | 5/2000 |
| JP | 2004-135106 | 4/2004 |
| JP | 2004-221805 | 8/2004 |

* cited by examiner

*Primary Examiner*—Chirag G Shah
*Assistant Examiner*—Salvador E Rivas
(74) *Attorney, Agent, or Firm*—Mattingly, Stanger, Malur & Brundidge, P.C.

(57) ABSTRACT

A modular type node apparatus for packet communication wherein, when an extension module is added to a switching unit, a control packet to request setting of forwarding control parameters indicating flow definition information of a packet to be processed by the extension module and an internal address is issued from the extension module to a control module of the packet communication node apparatus. The control module automatically sets a table entry indicating the relationship of the flow definition information and the internal address of the extension module in a packet forwarding control table to be referred by each of network interface modules.

10 Claims, 13 Drawing Sheets

DESTINATION TABLE 318

| DESTINATION IP ADDRESS ~318A | INTERNAL ADDRESS ~318B | |
|---|---|---|
| IP31 (CONTROL MODULE 31) | P31 | ~RT-1 |
| IP51 (EXTENSION MODULE 51) | P41 | ~RT-2 |
| IP52 (EXTENSION MODULE 52) | P42 | ~RT-3 |
| IP20 (SERVER 20) | P33 | ~RT-4 |
| IP10 (CLIENT 10) | P32 | ~RT-5 |
| ⋮ | ⋮ | |

ADDRESS SETTING MESSAGE M0 (M1)

| ADDRESS SETTING ~600 | INTERNAL ADDRESS ~601 | IP ADDRESS OF CONTROL MODULE ~602 | IP ADDRESS OF MODULE ~603 |
|---|---|---|---|
| | P41 | IP31 | IP51 |

FIG. 10

REQUEST MESSAGE FOR CONTROL DATA REGISTRATION M2

| CONTROL DATA REGISTRATION 600 | FLOW DEFINITION 611 | SERVICE ID 612 | LOAD BALANCE FLAG 613 | REDUNDANCY FLAG 614 | INTERNAL ADDRESS OF MODULE 615 | PROCESSING POWER (M bps) 616 |
|---|---|---|---|---|---|---|
| | TCP/D-PORT : 80 | 1 | 0 | 0 | P41 | 50 |

FIG. 11

FORWARDING CONTROL TABLE 317 (327)

| FLOW DEFINITION ~3171 | SERVICE ID ~3172 | LOAD BALANCE FLAG ~3173 | REDUNDANCY FLAG ~3174 | INTERNAL ADDRESS OF FORWARDING DESTINATION MODULE ~3175 | PROCESSING POWER ~3176 | LINK FLAG ~3177 |
|---|---|---|---|---|---|---|
| TCP/D-PORT : 80 | 1 | 0 | 0 | P41 | 50 | 0 | ~EN-1
| | | | | | | |
| | | | | | | |

FIG. 12

REQUEST MESSAGE FOR CONTROL DATA REGISTRATION M2

| 600 CONTROL DATA REGISTRATION | 611 FLOW DEFINITION | 612 SERVICE ID | 613 LOAD BALANCE FLAG | 614 REDUNDANCY FLAG | 615 INTERNAL ADDRESS OF MODULE | 616 PROCESSING POWER (M bps) |
|---|---|---|---|---|---|---|
| | TCP/D-PORT : 80 | 1 | 1 | 0 | P51 | 100 |

FIG. 13

FORWARDING CONTROL TABLE 317 (327)

| FLOW DEFINITION ~3171 | SERVICE ID ~3172 | LOAD BALANCE FLAG ~3173 | REDUNDANCY FLAG ~3174 | INTERNAL ADDRESS OF FORWARDING DESTINATION MODULE ~3175 | PROCESSING POWER ~3176 | LINK FLAG ~3177 | |
|---|---|---|---|---|---|---|---|
| TCP/D-PORT : 80 | 1 | 1 | 0 | P41 | 50 | 1 | ⎫ EN-1 |
| (TCP/D-PORT : 80) | (1) | 1 | 0 | P51 | 100 | 0 | ⎭ EN-2 |
|  |  |  |  |  |  |  |  |

MODULAR TYPE NODE APPARATUS FOR PACKET COMMUNICATION

CLAIM OF PRIORITY

The present application claims priority from Japanese application serial no. 2004-195467, filed on Jul. 1, 2004, the content of which is hereby incorporated by reference into this application.

BACKGROUND OF THE INVENTION (1) Field of the Invention

The present invention relates to a packet communication node apparatus, and more particularly to a modular type node apparatus for packet communication capable of additionally accommodating extension modules each provided with a specific communication service function.

(2) Description of the Related Art

A packet communication node apparatus, such as a router or a packet switch, basically comprises a control module for updating a destination table (routing table) by executing a predetermined routing protocol, a plurality of network interface modules each for communicating packets with network lines, and a switching unit for mutually connecting these modules. Each network interface module adds internal routing information designated in the destination table to each of packets received from a network, and the switching unit forwards the packet received from each network interface module to one of the other modules in accordance with the internal routing information.

As the IP (Internet Protocol) network has come into extensive use and the communication service becomes more rapid and advanced, packet communication node apparatuses are required to have functions to provide specific communication services in addition to the packet exchanging function. Therefore, in order to promptly respond to requests from users (communication service operators), it will be effective for any manufacturer supplying packet communication node apparatuses to supply a modular type node apparatus for which, for instance, spare connection ports for connecting additional modules to the packet switching unit are kept available, so that when a user requests the addition of a specific service function, it can additionally accommodate in its packet switching unit an extension module designed to meet the user's requirements. In this case, the setting of control data, needed for operating the extension module, into the packet communication node apparatus would pose a problem.

In the field of information processing systems, as described in Japanese Patent Application Laid-Open No. 2000-132487 (Patent Reference 1) for instance, there is proposed a system in which driver software needed on the server side is built in advance into each of peripheral devices to be connected to a server via a network. When the server selects any of the peripheral devices to operate it, if the module (driver software) needed for the operation of this peripheral device is found absent on the server side, the server sends a message requesting the driver software to the peripheral device. The server stores the driver software received from the peripheral device and operates the peripheral device by executing the stored driver software.

The system proposed in Patent Reference 1 is characterized in that, when a new peripheral device is added to the server, the server noticing the absence of the driver software needed for operating the peripheral device, requests the peripheral device for transmitting the driver software. In this case, the peripheral device newly added to the system has no active part in sending the control information to the server. Therefore, if it is attempted to apply this configuration to the above-described packet communication node apparatus, the control module or each network interface will play the active part in acquiring control data from the newly added extension module. In the case of a packet communication node apparatus, however, each network interface only operates, every time a packet is received, so as to refer to a destination table prepared in advance, add internal routing information corresponding to the destination module address to the received packet and supply the packet to the switching unit. The network interface has no function to detect the absence of routing information for the extension module and to request the extension module for such control data. Nor can the control module detect the absence of control data for the extension module, because it is in no position to operate the extension module by using control data for the extension module.

SUMMARY OF THE INVENTION

An object of the present information, therefore, is to provide a modular type node apparatus for packet communication that facilitates setting of control data for operating newly added extension modules.

Another object of the invention is to provide a modular type node apparatus for packet communication in which, even in the co-presence of a plurality of extension modules having the same communication service function, each network interface module can control the forwarding of packets received from the network to an appropriate extension module.

In order to achieve the objects, in a modular type node apparatus for packet communication according to the invention, when an extension module is added to a switching unit, a control packet to request setting of control data (control parameters) indicating the flow definition information of a packet to be processed by the extension module and an internal address of the extension module is transmitted from the extension module to a control module of the packet communication node apparatus, and the control module automatically sets a table entry indicating the relationship between the flow definition information and the internal address of the extension module indicated in the request packet into a packet forwarding control table to be referred to by each of network interface modules. The address information to be applied to the header of the request packet for setting control data is automatically notified from the node apparatus side to the extension module when the connection of the extension module has been detected.

More specifically, the modular type node apparatus for packet communication according to the invention comprises a control module, a plurality of network interface modules each for communicating packets with a network, a plurality of extension module connection interface units each connectable with an extension module additionally, and a packet switching unit for connecting the modules and interface units to each other and forwarding a packet received from each of the modules to one of the other modules and the other interface units specified by an internal address indicated in an internal header added to the received packet, wherein each of the extension module connection interface units comprises: a controller for transmitting, when an extension module is connected, to the extension module an address setting message indicating a packet address of the control module and a packet address and the internal address allocated to the extension module; and an internal address adding unit for outputting, upon receiving from the extension module a request packet for control data registration having a packet address destined for the control module and indicating a relationship between flow definition information for identifying a packet to be processed by the extension module and the internal address of the extension module, the request packet to the packet switching unit in a form of an internal packet with an internal header including an internal address of the control module, the control module registers, upon receiving the request packet for control data registration from the packet switching unit, a table entry indicating the relationship between the flow definition information and the internal address of the extension module indicated in the request packet into a packet forwarding control table to be referred to by each of the network interface modules, and each of the network interface modules outputs, upon receiving from a network a packet with header information matching the flow definition information indicated in the packet forwarding control table, the received packet to the packet switching unit in a form of an internal packet with an internal header including the internal address corresponding to the flow definition information indicated in the packet forwarding control table.

According to the invention, each of the extension modules comprises a memory storing flow definition information for identifying a received packet to be processed by the extension module and a service identifier indicating the type of service processing to be provided by the extension module; and a module controller having a function to issue a request packet for control data registration in its initial operation and to execute service processing in response to reception of a packet matching the flow definition information in its steady operation.

In one embodiment of the invention, the controller of each of the extension module connection interface units has a memory for storing an internal address value of the extension module connection interface unit and packet address values of the control module and an extension module notified in advance by the control module, and generates the address setting message to be transmitted to the extension module by applying the address values read out of the memory when an extension module is connected thereto.

In one embodiment of the invention, the controller of each of the extension module connection interface units notifies the control module of the connection of the extension module to the extension module connection interface unit, and forwards to the extension module an address setting message indicating the packet address and the internal address received from the control module.

A feature of the invention resides in that each of the network interface modules has a flow controller for referring to the packet forwarding control table when a packet was received from a network, searching a destination table, which indicates relationships between packet destination addresses and internal addresses, for an internal address to be applied to the received packet when the header information of the received packet is found not matching the flow definition information, and outputting the received packet to the switching unit in a form of an internal packet with an internal header including the internal address searched.

Another feature of the invention resides in that the request packet for control data registration received from the extension module includes information indicating the operating mode of the extension module; the control module registers in the packet forwarding control table a table entry indicating the relationship among the flow definition information, the extension module internal address and the operating mode indicated by the request packet for control data registration; and the flow controller of each of the network interface modules has means for judging, when a packet with header information matching the flow definition information indicated in the packet forwarding control table is received from a network, the validity of the extension module internal address indicated in a table entry including the flow definition information in accordance with the operating mode indicated in the table entry.

Still another feature of the invention resides in that the request packet for control data registration received from the extension module includes an identifier of the communication service to be provided by the extension module and a load balance flag indicating whether the load should be balanced between the extension module and another extension module for providing the same service; at least two table entries of the packet forwarding table indicate the communication service identifier and the load balance flag; and each of the network interface modules has a load balance controller for checking, when a packet with header information matching the flow definition information indicated in a first table entry of the packet forwarding control table is received from a network, the load balance flag of the first table entry, and selecting in accordance with a predetermined algorithm, if the load balance flag indicates execution of load balancing, either an extension module internal address indicated by the first table entry or an extension module internal address indicated by a second table entry having the same service identifier as the first table entry searched from the packet forwarding control table.

According to the invention, it is possible to automatically register, in a packet forwarding control table to be referred to by each of the network interface modules, a table entry indicating the relationship between flow definition information for selecting a packet to be forwarded to an extension module from among packets received from a network, and the internal destination address of the extension module at the time of adding the extension module. Further, by storing in the table entries of the packet forwarding control table, for instance, the type of service provided by the extension module and the operating mode as additional information items besides the flow definition information and the internal address of the destination, it becomes possible to distribute received packets to an appropriate extension module selected in accordance with the operating mode even where a plurality of extension modules having the same service functions coexist.

BRIEF DESCRIPTION OF THE DRAWINGS

FIG. 10 shows one example of request message M2 for control data registration to be transmitted from the first extension module 51.

FIG. 11 shows the state of forwarding control tables 317 and 327 at the time of receiving the message M2 in FIG. 10.

FIG. 12 shows one example of request message M2 for control data registration to be transmitted from the second extension module 52.

FIG. 13 shows the state of the forwarding control tables 317 and 327 at the time of receiving the message M2 in FIG. 11.

DETAILED DESCRIPTION OF THE PREFERRED EMBODIMENT

A preferred embodiment of the present invention will be described below with reference to the accompanying drawings.

Figure 1:
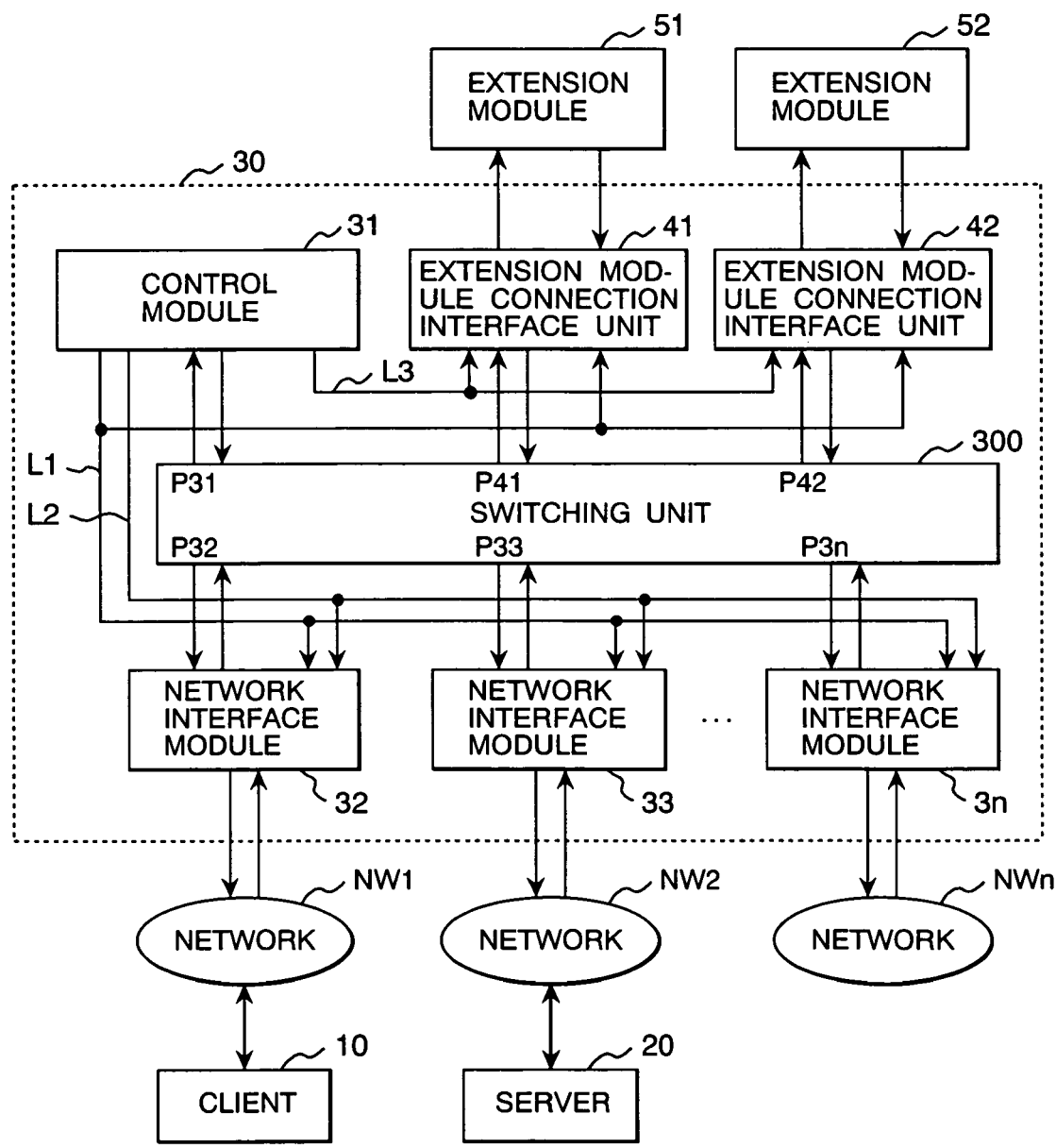
FIG. 1 is a block configurative diagram showing a packet communication node apparatus, which is one preferred embodiment of the present invention.

FIG. 1 shows a packet communication node apparatus 30 according to the invention.

The packet communication node apparatus 30 comprises a control module 31, network interface modules 32 through 3n and extension module connection interface units 41 and 42 each of which is connected to a switching unit 300. The communication node apparatus 30 can accommodate extension modules 51 and 52 having specific service functions to the switching unit 300 via the extension module connection interface units 41 and 42. The network interface modules 32 through 3n are connected to networks NW1 through NWn, respectively. A client terminal 10 is connected to the network NW1, and a Web server 20 is connected to the network NW2. Although only two extension module connection interface units 41 and 42 are shown in FIG. 1, the number of extension module connection interface units connected to the switching unit 300 may be three or more.

Figures 6, 7, 8:
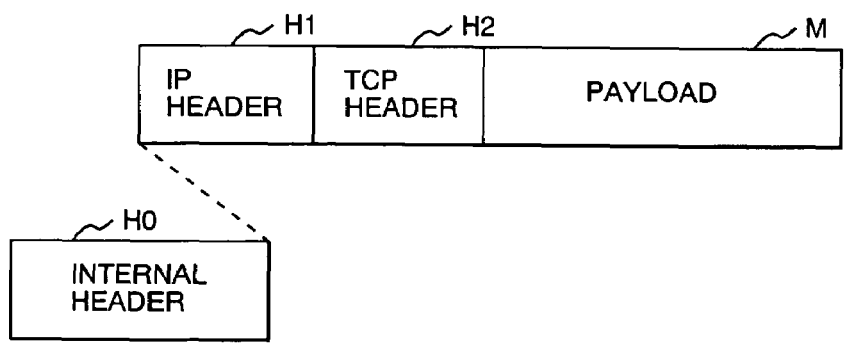
FIG. 6 shows a destination table 318 prepared in the control module 31.
FIG. 7 shows the configuration of an IP packet to be communicated between each of network interface modules 32 through 3n and a network and that of an internal packet handled by the switching unit 300.
FIG. 8 shows the format of address setting messages M0 and M1.

Symbols P31 through P42 in the box representing the switching unit 300 here denote output port numbers of the switching unit. In this embodiment, the network interface modules 32 through 3n are supposed to communicate IP packets having an IP header H1 and a TCP header H2 added to a payload M as shown in FIG. 7, with the networks NW1 through NWn, respectively. The switching unit 300 is supposed to receive internal packets each having an internal header H0 added to the IP header, and perform packet switching in accordance with an internal address (one of the output port numbers P31 through P42) indicated in the internal header H0.

The specific configuration and operations of the packet communication node apparatus 30 according to the invention will be described below with reference to an embodiment wherein modules each having a Web cache service function are added as the extension modules 51 and 52.

In this embodiment, a Web content request packet issued by the client terminal 10 and addressed to the Web server 20 is forwarded to the extension module 51 (or 52) through the network interface module 32 and the switching unit 300. When the requested content is in the cache memory, a Web response packet issued by the extension module 51 (or 52) will be forwarded to the network interface module 32 through the switching unit 300, and transmitted to the client terminal 10 via the network NW1.

If the requested content is absent in the cache memory, a Web content request packet issued from the extension module 51 will be forwarded to the network interface module 33 through the switching unit 300 and transmitted to the network NW2. A Web response packet to the request issued from the server 20 is forwarded to the extension module 51 through the network interface module 33 and the switching unit 300. The extension module 51 issues a Web response packet addressed to the client device 10 after storing the copy of the received content in the cache memory. This response packet is forwarded to the network interface module 32 through the switching unit 300, and transmitted to the client terminal 10 which is the requester of the Web content via the network NW1.

A feature of the invention resides in that, when the first extension module 51 is connected to the connection interface unit 41 and made operable by the turning-on of power supply, flow control parameters for forwarding to the extension module 51 the received packet to be served by the extension module 51 are automatically set into the network interface modules 32 through 3n with the cooperation of the control module 31, the connection interface unit 41 and the extension module 51.

In the case where the first extension module 51 is already in an operating state and the second extension module 52 having the same function as the first extension module 51 is additionally connected to the connection interface unit 42, the second extension module 52 can operate in one of the following modes: (1) a load balance mode in which the second extension module operates in parallel with the first extension module 51 in a load-shared manner, (2) a replace mode in which the second extension module replaces the first extension module 51 to provide service, and (3) a redundant mode in which the second extension module stands by as a extra unit and replaces the first extension module 51 to provide service when any trouble occurs in the first extension module 51.

Another feature of the invention resides in that, when the first extension module 51 (52) is connected to the connection interface unit 41 (42) and made operable by the turning-on of power supply, the network interface modules 32 through 3n are enabled, by designating in advance the operating mode in the memory of the extension module, to selectively change over the forward destination of the received packet according to the operating mode of the extension module.

Figure 2:
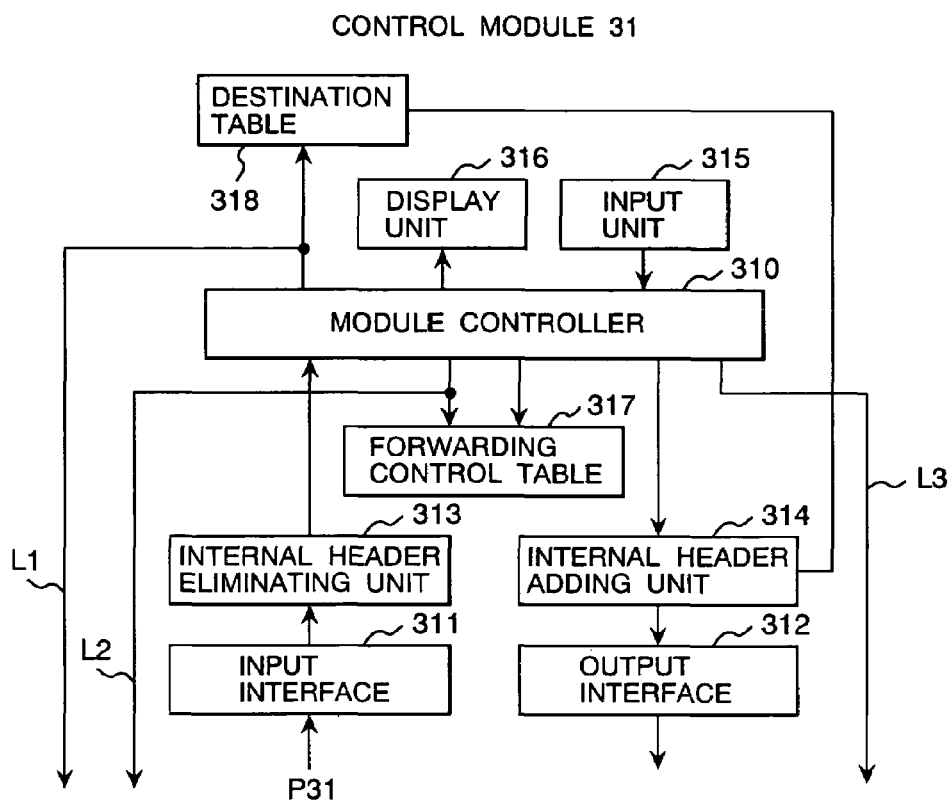
FIG. 2 is a block diagram showing details of the control module 31 shown in FIG. 1.

FIG. 2 shows one example of detailed structure of the control module 31.

The control module 31 comprises a module controller 310, an input interface 311 connected to an output port (port No. P31) of the switching unit 300, an the output interface 312 connected to an input port of the switching unit 300, an internal header eliminating unit 313 for eliminating the internal header from each internal packet outputted from the input interface 311 and supplying the packed to the module controller 310 as the received packet, an internal header adding unit 314 for adding an internal header to a transmission packet outputted from the module controller 310 and supplying the packet to the output interface 312 as an internal transmission packet, and an input unit 315, a display unit 316, a forwarding control table 317 and a destination table (routing table) 318 which are connected to the module controller 310.

As shown in FIG. 11 and FIG. 13, the forwarding control table 317 includes at least one entry which indicates, in association with flow definition information 3171, the identifier (service ID) 3172 of the service provided by the extension module, a load balance flag 3173 and a redundancy flag 3174 for designating the operating mode of the extension module, the internal address 3175 of forwarding destination module, the processing power 3176 of the extension module, and a link flag 3177.

On the other hand, as shown in FIG. 6, the destination table 318 includes a plurality of entries RT-1, RT-2, . . . each indicating the correspondence of a destination IP address 318A with an internal address 318B. Here, for ready understanding of the correspondence among modules, for instance, the IP address of the control module 31 is represented by "IP 31" and that of the extension module 51 by "IP 51" matched with the reference character of modules.

The contents of the destination table 318 and the forwarding control table 317 are updated by the module controller 310. Changes in the contents of the destination table 318 and the forwarding control table 317 are reflected via signal lines L1 and L2 to the destination tables provided in the extension module connection interface units 41 and 42 and the destination table and the forwarding control table provided in each of the network interfaces 32 through 3n as will be described afterwards. Upon receiving a transmission packet from the module controller 310, the internal header adding unit 314 searches the destination table 318 for an internal address corresponding to the destination IP address of the transmission packet, and outputs the transmission packet to the output interface 312 in the form of a internal packet with an internal header indicating the internal address searched.

Figure 3:
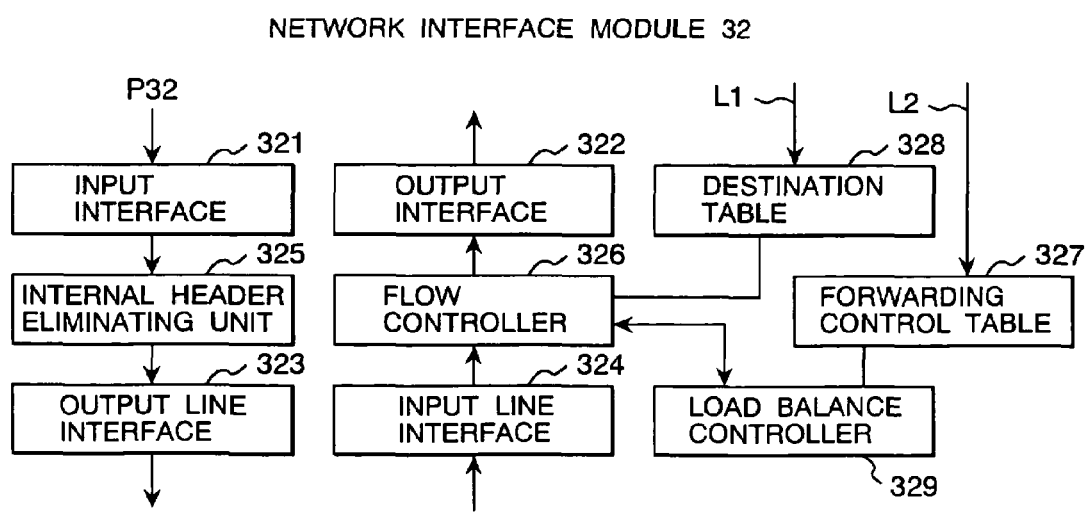
FIG. 3 is a block diagram showing details of the network interface module 32 shown in FIG. 1.

FIG. 3 shows one example of detailed structure of the network interface module 32. The other network interface modules 33 and 34 have the same configuration.

The network interface module 32 comprises an input interface 321 connected to an output port (port No. P32) of the switching unit 300, an output interface 322 connected to an input port of the switching unit 300, an output line interface 323 connected to an output line of the network NW1, an input line interface 324 connected to an input line from the network NW1, an internal header eliminating unit 325 for eliminating the internal header from the internal transmission packet outputted from the input interface 321 and supplying the packet to the output line interface 323 as a transmission packet, a flow controller 326 connected between the output interface 322 and the input line interface 324, a forwarding control table 327 connected to a signal line L2, a destination table 328 connected to a signal line L1, and a load balance controller 329 connected to the flow controller 326.

A packet from the network NW1 is received by the input line interface 324, and inputted to the flow controller 326. Upon receiving the packet from the input line interface 324, the flow controller 326 notifies the header information of the received packet to the load balance controller 329. On the basis of this header information, the load balance controller 329 searches the forwarding control table 327 for an entry, and returns the result of search to the flow controller 326. If the header information matches the flow definition 3171 of any of entries registered in the forwarding control table 327, the internal address 3175 of the forwarding destination module indicating the forwarding destination of the received packet will be notified to the flow controller 326 as the result of search. If the header information matches none of the flow definitions, a notification indicating no matched entry will be returned to the flow controller 326.

When notified a forwarding destination module internal address from the load balance controller 329, the flow controller 326 adds an internal header indicating the forwarding destination module internal address to the received packet and output the packet to the output interface 322. If notified of the absence of any entry matching the received packet, the flow controller 326 will search the destination table 328 for an internal address corresponding to the destination IP address of the received packet, add an internal header indicating the searched internal address, and outputs the packet to the output interface 322. Detailed operations of the flow controller 326 and the load balance controller 329 will be described hereinafter with reference to FIG. 15 and FIG. 16.

Figure 4:
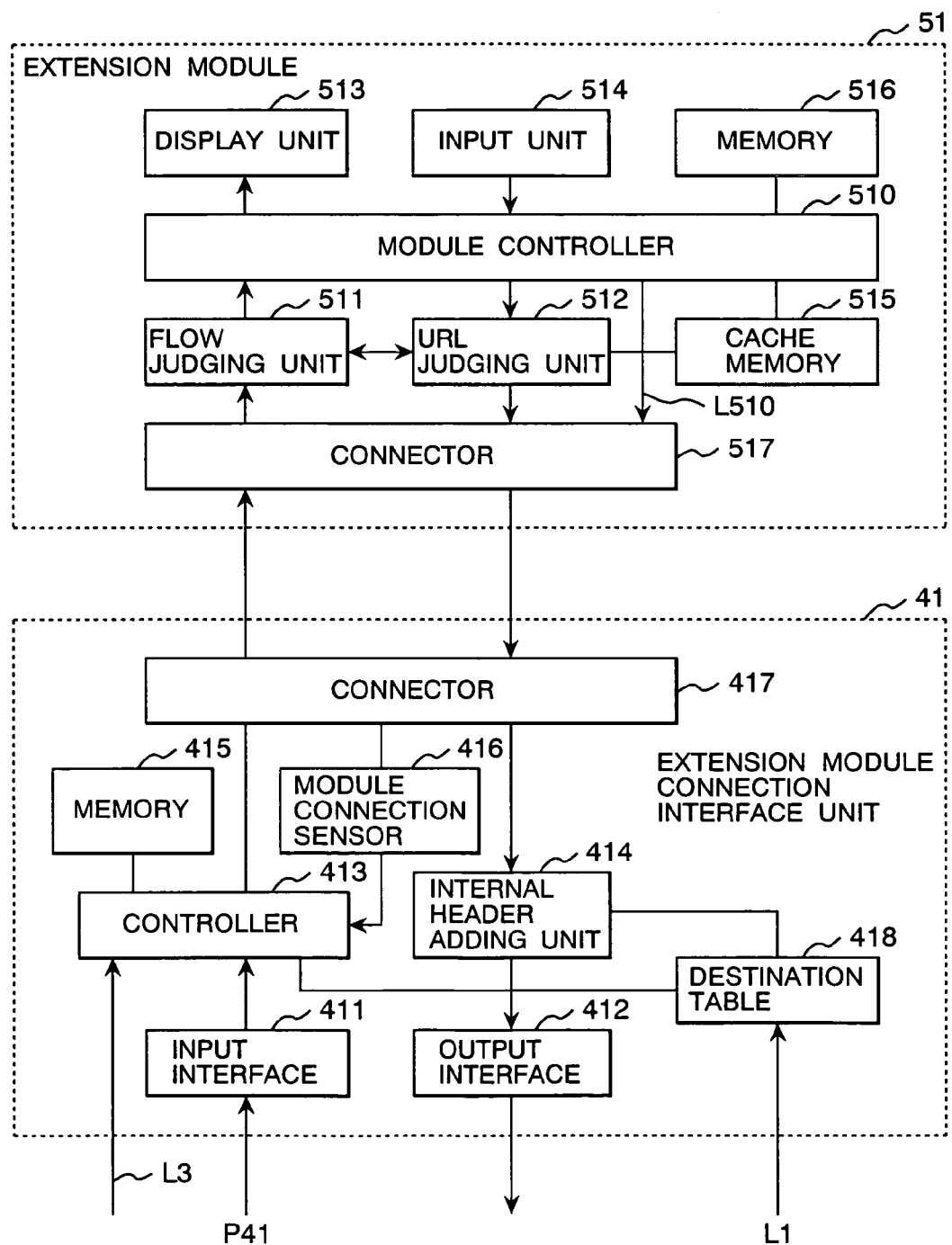
FIG. 4 is a block diagram showing details of the extension module 51 and the extension module connection interface unit 41 shown in FIG. 1.

FIG. 4 shows one example of detailed structure of the extension module 51 and the extension module connection interface unit 41. The extension module connection interface unit 42 has similar structure as the connection interface unit 41.

In this embodiment, the extension module 51 is intended to provide Web cache service, and comprises a module controller 510, a flow judging unit 511, a URL judging unit 512, a display unit 513, an input unit 514, a cache memory 515 and a nonvolatile memory 516 which are connected to the module controller 510 and a connector 517. Web contents received from the Web server 20 are stored in the cache memory 515. The memory 516 stores flow control parameter information to be registered in the forwarding control table 317.

On the other hand, the extension module connection interface unit 41 comprises an the input interface 411 connected to an output port (port No. P41) of the switching unit 300, an output interface 412 connected to an input port of the switching unit 300, a controller 413 connected to the input interface 411, an internal header adding unit 414 connected to the output interface 412, and a memory 415, a module connection sensor 416, a connector 417 and a destination table 418 which are connected to the controller 413.

Next, the initial operations of the control module 31, the extension module connection interface units 41 and 42, the extension modules 51 and 52 will be described by referring to FIG. 5 through FIG. 13.

Figure 5:
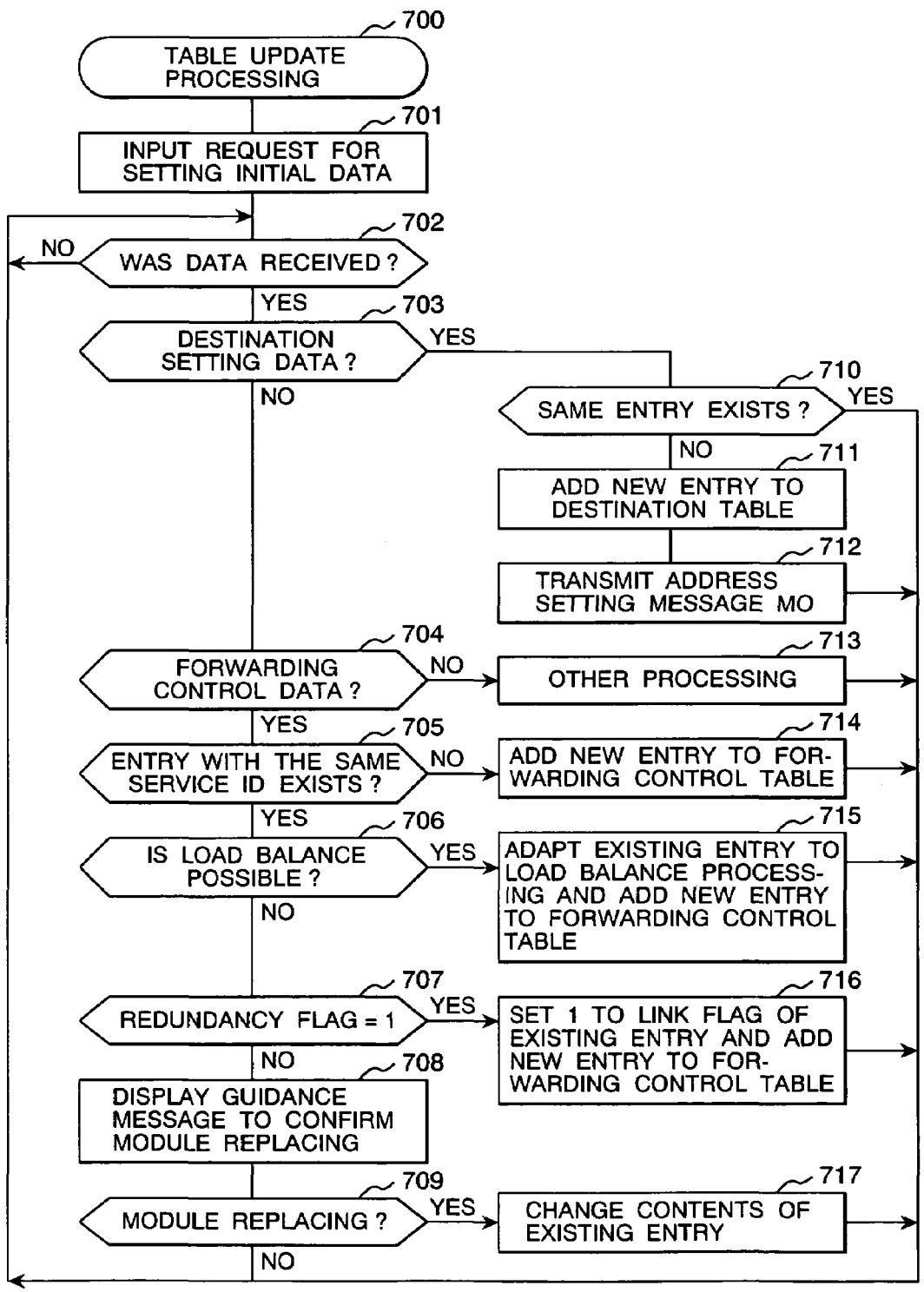
FIG. 5 is a flow chart showing one embodiment of a table update processing routine 700 to be executed by the module controller 310 of the control module 31.

FIG. 5 is a flow chart showing a table update processing routine 700 to be executed by the module controller 310 of the control module 31.

When power supply to the control module 31 is turned on, the module controller 310 executes the table update processing routine 700. The module controller 310 first outputs an input request message for setting initial data to the display unit 316 (step 701), and waits for data input from the input unit 315 or the internal header eliminating unit 313 (702). Upon receiving data, the module controller 310 judges whether the received data are for destination setting to be registered in the destination table 318 (703). If the received data are destination setting data indicating the relationship between the destination IP address and the internal address, the module controller 310 judges whether a routing information entry of the same content as the received data was already registered in the destination table 318 (710).

If there exists the same entry in the destination table 318, the module controller 310 ignores the received data and waits for the next data reception. If there is no entry same as the received data in the destination table 318, the module controller 310 adds the received data to the destination table 318 as a new entry (711), generates an address setting message M0 and outputs to a signal line L3 (712).

The operator of the node apparatus repeats the input operations of destination setting data regarding the control module 31 and the extension module connection interface units 41 and 42, whereby routing information entries RT-1 through RT-3 are registered in the destination table 318. Since the routing information entries RT-4, RT-5, . . . , which are required for packet forwarding among the network interface modules 32 through 3n, are of a nature to be automatically added in accordance with the routing protocol function of the module controller 310, description is omitted here.

As shown in FIG. 8, the address setting message M0 generated in conformity to the operator's input operation of the destination setting data includes, following a message type 600 indicating that it is an address setting message, an internal address (port No.) 601, the IP address 602 of control module, and the IP address 603 of module. To the IP address 603 of module and the internal address (port No.) 601, the values of the destination IP address 318A and the internal address 318B indicated in the additional entry added to the destination table 318 are set. To the IP address 602 of control module, the IP address of the control module 31 ("IP 31" in this case) is always set. FIG. 8 shows the address setting message M0 generated when the entry RT-2 has been added to the destination table 318.

The address setting message M0 is inputted to the controllers 413 of the extension module connection interface units 41 and 42 via the signal line L3. Upon receiving the address setting message M0 from the signal line L3, each of the controllers 413 checks the internal address 601 of the received message, and judges as a valid message only the message having the internal address 601 identical to the port No. having been assigned to the controller 413 and stored in the memory 415 previously.

Accordingly, the controller 413 of the extension module connection interface unit 41 having port No. "P41" treats as a valid message only the address setting message M0 that is generated when the entry RT-2 was added to the destination table 318, and stores the value "IP 31" of the IP address 602 of control module and the value "IP 51" of the IP address 603 of module indicated in the received message M0 into the memory 415. The value "IP 51" of the IP address 603 of module is used as the IP address assigned to the extension module 51 when the extension module 51 is connected to the connection interface unit 41.

Similarly, the controller 413 of the extension module connection interface unit 42 having port No. "P42" treats as a valid message only the address setting message M0 received from the signal line L3 when the entry RT-3 was added to the destination table 318, and stores the value "IP 31" of the address 602 of control module and the value "IP 52" of the IP address 603 of module indicated in the received message into the memory 415.

The controllers 413 of the extension module connection interface units 41 and 42 are waiting for the connection of the extension modules 51 and 52, respectively. When the operator connects (plugs in) the first extension module 51 to the extension module connection interface unit 41, the output signal of the module connection sensor 416 varies. Upon detecting the connection of the extension module 51 from the variation in the output signal of the module connection sensor 416, the controller 413 generates an address setting message M1 having the same format as that of the message M0 shown in FIG. 8 by applying port No. "P41", the IP address value "IP 31" of control module and the IP address "IP 51" of module already stored in the memory 415. This message M1 is transmitted to the extension module 51 after adding an IP header H1 and a TCP header H2. In this case, a broadcast address is set as the destination IP address in the IP header H1.

Figure 9:
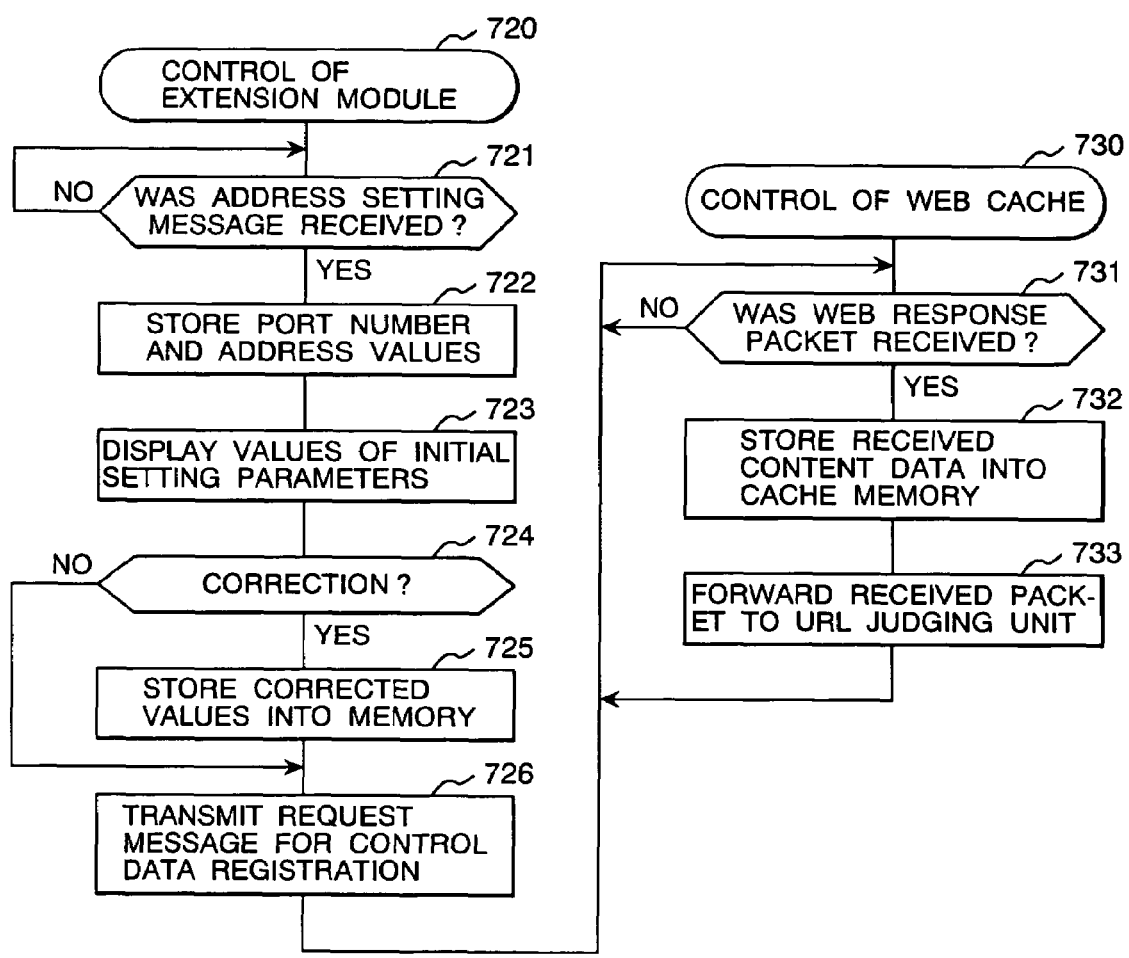
FIG. 9 is a flow chart showing one embodiment of an extension module control routine 720 to be executed by the module controller 510 of the extension module 51.

When the extension module 51 is connected to the connection interface unit 41 and power supply is turned on, the module controller 510 executes an extension module control routine 720 shown in FIG. 9, and waits for the reception of the address setting message M1 (step 721).

A packet including the address setting message M1 which was transmitted from the controller 413 of the connection interface unit 41 is received by the flow judging unit 511 of the extension module 51. The flow judging unit 511 judges the destination IP address of the received packet, and forwards the received packet to the module controller 510 if the packet is destined for the extension module or a broadcast packet. The other packets are forwarded to the URL judging unit 512. Therefore, the packet including the address setting message M1 is inputted to the module controller 510.

Upon receiving the address setting message M1, the module controller 510 stores the port No. "P41", the IP address value "IP 31" of control module and the IP address value "IP 51" of module indicated in the received message into the memory 516 (722). In the memory 516, a flow definition, a service ID, a load balance flag and a redundancy flag for designating the operating mode, and a value indicating the processing power (Mbps) are already stored according to the type of service provided by the extension module 51, as flow control parameters for controlling packet forwarding from the network interface module to the extension module 51.

Upon completion of storing the address values extracted from the address setting message M1 (722), the module controller 510 reads out the flow control parameters from the memory 516, displays them on the display unit 513 as values of initial setting parameters (723), and waits for a response from the operator. The operator checks the displayed values of parameters, and corrects with the input unit 514 any parameter if necessary. In this case, the module controller 510 stores the corrected value of any parameter into the memory 516 (725). When the displayed values of parameters are acceptable, the operator instructs execution of parameter setting (724). It should be noted that steps 723 through 725 are not essential for the present invention.

In response to the instruction from the operator, the module controller 510 generates a request message M2 for control data registration shown in FIG. 10 by applying these flow control parameters and the internal address "P41" of module read out from the memory 516, and transmits the message to the connection interface unit 41 after adding IP/TCP headers to it (726). In this case, the IP address "IP 31" of control module is applied as the destination address of the IP header, and the IP address "IP 51" of module as the source address. Upon completing the transmission of the request message M2 for control data registration, the module controller 510 transits to the operation mode of Web cache control 730, and waits for reception of a Web response packet (731).

As shown in FIG. 10, the request message M2 for control data registration includes, following the message type 600 indicating that the message is a request for control data registration, a flow definition 611, a service ID 612, a load balance flag 613, a redundancy flag 614, an internal address 615 of module and a module processing power 616. Here, the flow definition "TCP/D-PORT: 80" denotes a Web request packet in which the destination port No. of TCP header H2 is "80", and the service ID "1" denotes that the service to be provided by the extension module 51 is a Web cache service. The load balance flag "0" and the redundancy flag "0" denote that the extension module 51 operates in an operation mode to accept all the received packets matching the flow definition and executes Web service processing independently.

An IP packet including the request message M2 for control data registration is inputted to the internal header adding unit 414 of the connection interface unit 41 via a signal line L510 and the connectors 517 and 417. Upon receiving the IP packet, the internal header adding unit 414 searches the destination table 418 for the internal address "P31" corresponding to the destination address "IP 31" of the received packet, adds an internal header H0 including the internal address "P31" to the received packet, and outputs the received packet to the output interface 412. This packet is forwarded to the control module 31 through the switching unit 300 and inputted to the module controller 310 after eliminating the internal header H0 by the internal header eliminating unit 313.

Upon receiving the IP packet including the request message M2 for control data registration, the module controller 310 judges, from the message type 600 of the received message, that forwarding control data was received at step 704 of the flow chart shown in FIG. 5. In this case, the module controller 310 refers to the forwarding control table 317 to check whether any entry having the same service ID 3172 as that of the service ID 612 indicated in the received message M2 was already registered (705). In this example, as the extension module 51 having the service ID "1" is the first module to execute Web service, the module controller 310 adds, as shown in FIG. 11, a new entry EN-1 created based on the request message M2 to the forwarding control table 317 (714), and returns to step 702 to wait for reception of the next data. If the received data are of other than forwarding control data at step 704, some other processing will be executed according to the type of the received data (713).

The addition of the entry EN-1 to the forwarding control table 317 is reflected to the network interface modules 32 through 3n via the signal line L2, and the entry EN-1 is also registered in the individual forwarding control table 327 of each of the network interface modules. Therefore, when the client terminal 10 transmits a Web request packet to the server 20, this Web request packet is inputted to the switching unit 300 in a form of a packet with an internal header H0, which includes the internal address "P41" indicated by the internal address 3175 of forwarding destination module of the entry EN-1, added by the network interface module 32, and forwarded to the extension module 51 through the switching unit 300.

Next, the operations of the packet communication node apparatus 30 will be described in the case where the operator has connected the second extension module 52 having the same service function as the first extension module to the connection interface unit 42. Since the constituent elements of the second extension module 52 are the same as those of the first extension module 51, the following description will use the reference characters shown in FIG. 4 and refer to the flow chart of FIG. 9.

The second extension module 52 is plugged in, for instance, when the processing power of the first extension module 51 becomes insufficient. The second extension module 52 may be operated either in an operation mode of load balance with the first extension module 51 or to replace the first extension module 51. The following description will refer to a case where the second extension module 52 is operated in a mode of load balance with the first extension module 51.

The controller 413 of the extension module connection interface unit 42 is also waiting for connection of the second extension module 52. When the second extension module 52 is connected (plugged in) to the connection interface unit 42, as described with reference to the connection interface unit 41, the module connection sensor 416 detects the connection of the extension module 52, and the controller 413 generates an address setting message M1 of the same format as the message M0 by applying port No. "P42", the IP address value "IP 31" of control module and the IP address value "IP 52" stored in the memory 415 and transmits the message as an IP packet having a broadcast address to the extension module 52.

Upon receiving the address setting message M1, the module controller 510 of the extension module 52 stores port No. "P42", the IP address value "IP 31" of control module and the IP address value "IP 52" of module indicated in the received message into the memory 516 (step 722 in FIG. 9). It is supposed here that the flow definition and service ID, load balance flag "1", redundancy flag "0" and processing power "100" Mbps same as in the extension module 51 are set in advance as flow control parameters in the memory 516 of the extension module 52. At step 726 of FIG. 9, the module controller 510 generates the request message M2 for control data registration shown in FIG. 12 by applying these flow control parameters and the internal address "P42" of module read out from the memory 516, and transmits the request message M2 to the connection interface unit 42 in a form of an IP packet with an IP header wherein the IP address "IP 31" of control module is applied as the destination address and the IP address "IP 52" of module as the source address.

After adding an internal header H0 including the internal address "P31" by the connection interface unit 42, the IP packet including the request message M2 for control data registration is forwarded to the control module 31 through the switching unit 300. In the control module 300, after eliminating the internal header H0 by the internal header eliminating unit 313, the IP packet is inputted to the module controller 310.

Upon receiving the IP packet including the request message M2 for control data registration, the module controller 310 judges from the message type 600 that the received message is of forwarding control data at step 704 of the flow chart shown in FIG. 5, and refers to the forwarding control table 317 (705). Since this time the entry EN-1 having the same service ID 3172 as the service ID 612 of the received message M2 has been already registered in the forwarding control table 317, the module controller 310 checks the load balance flag 613 of the received message M2 (706).

Since the load balance flag is "1" in the received message M2, the module controller 310 sets "1" to the link flag 3177 of the existing entry EN-1 as shown in FIG. 13 and, after rewriting the load balance flag 3173 of the entry EN-1 to "1", adds a new entry EN-2 created based on the received message M2 to the forwarding control table 317 (715). By setting the link flag 3177 to "1", it is known, when the entry EN-1 is retrieved from the forwarding control table 317 or 327, the presence of a related entry having the same service ID, linked to that entry EN-1.

If the load balance flag is "0" in the received message M2 here, the module controller 310 will check the redundancy flag 614 of the received message (707) and, if the redundancy flag 614 is "1", add a new entry EN-2 created based on the received message M2 to the forwarding control table 317 (716) after setting "1" to the link flag 3177 of the entry EN-1. In this case, the second extension module 52 is treated as a standby module for the first extension module 51 currently in operation.

If the redundancy flag 614 of the received message M2 is "0", it means that the existence of two extension modules whose operating modes are exactly identical. Usually such a case arises when the existing extension module 41 is replaced with a subsequently added high-performance module 51, but it is also possible the operator has inadvertently connected the second extension module by mistake. In view of this possibility, in this embodiment the module controller 310 displays on the display unit 316 a guidance message to confirm the necessity of module replacement (708). If the operator instructs module replacement (709), the content of the existing entry EN-1 will be replaced by that of the received message M2, namely by the entry EN-2 (717).

Incidentally, in order to omit input operations by the operator, it is also conceivable to add in advance a replace instruction flag to the request message M2 for control data registration so that the module controller 310 automatically executes step 717 when the replace instruction flag is "1". An error message may be outputted to the display unit 316 when the replace instruction flag is "0". When the first extension module is replaced by the second extension module, it is possible to operate the first extension module as a redundancy module by temporarily eliminating the first extension module from the connection interface unit 41 and setting the redundancy flag of the memory 516 to "1" before connecting it again to the connection interface unit 41.

Figure 14:
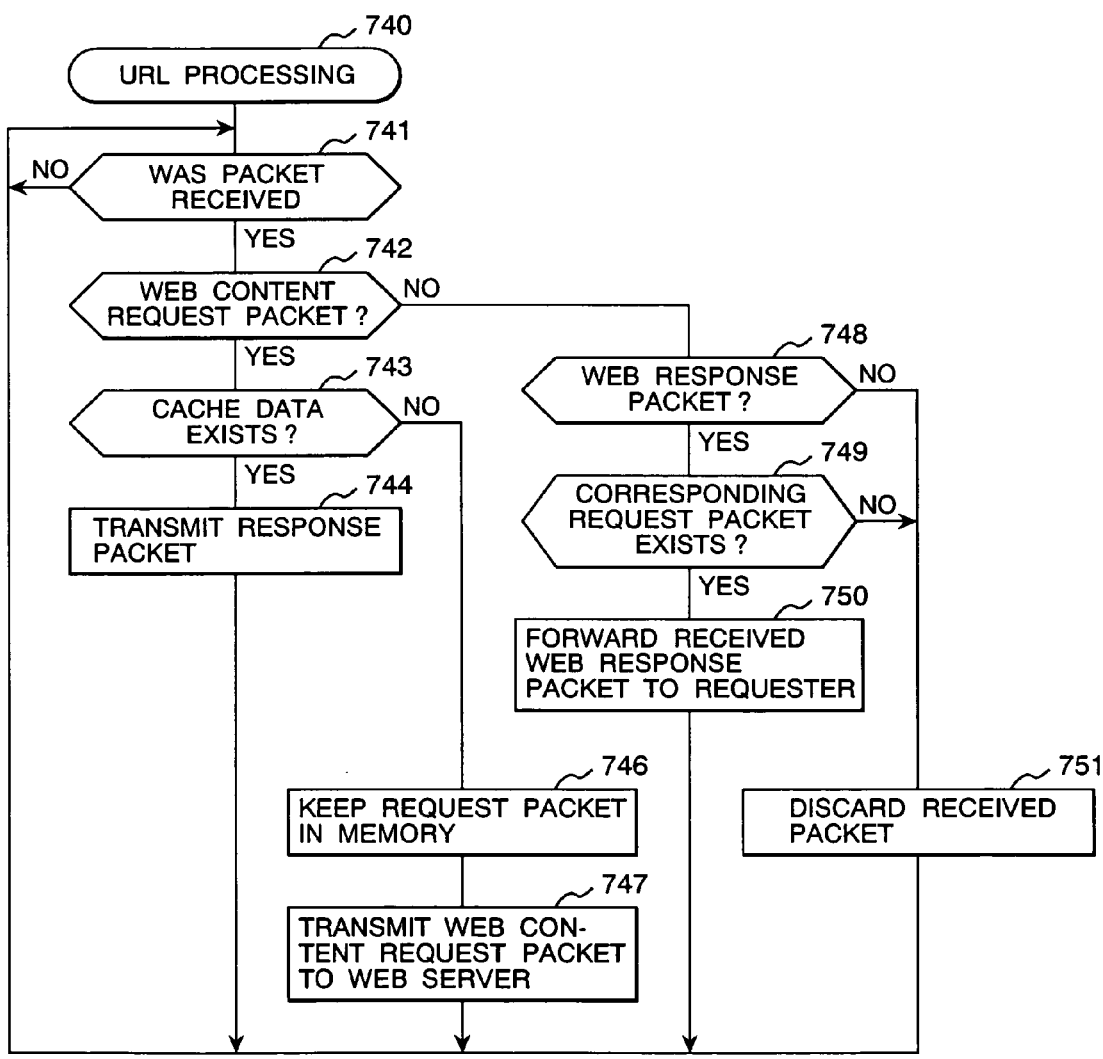
FIG. 14 is a flow chart showing one embodiment of a URL processing routine 740 to be executed by the URL judging unit 512 of the extension module 51 or 52.
Figure 15:
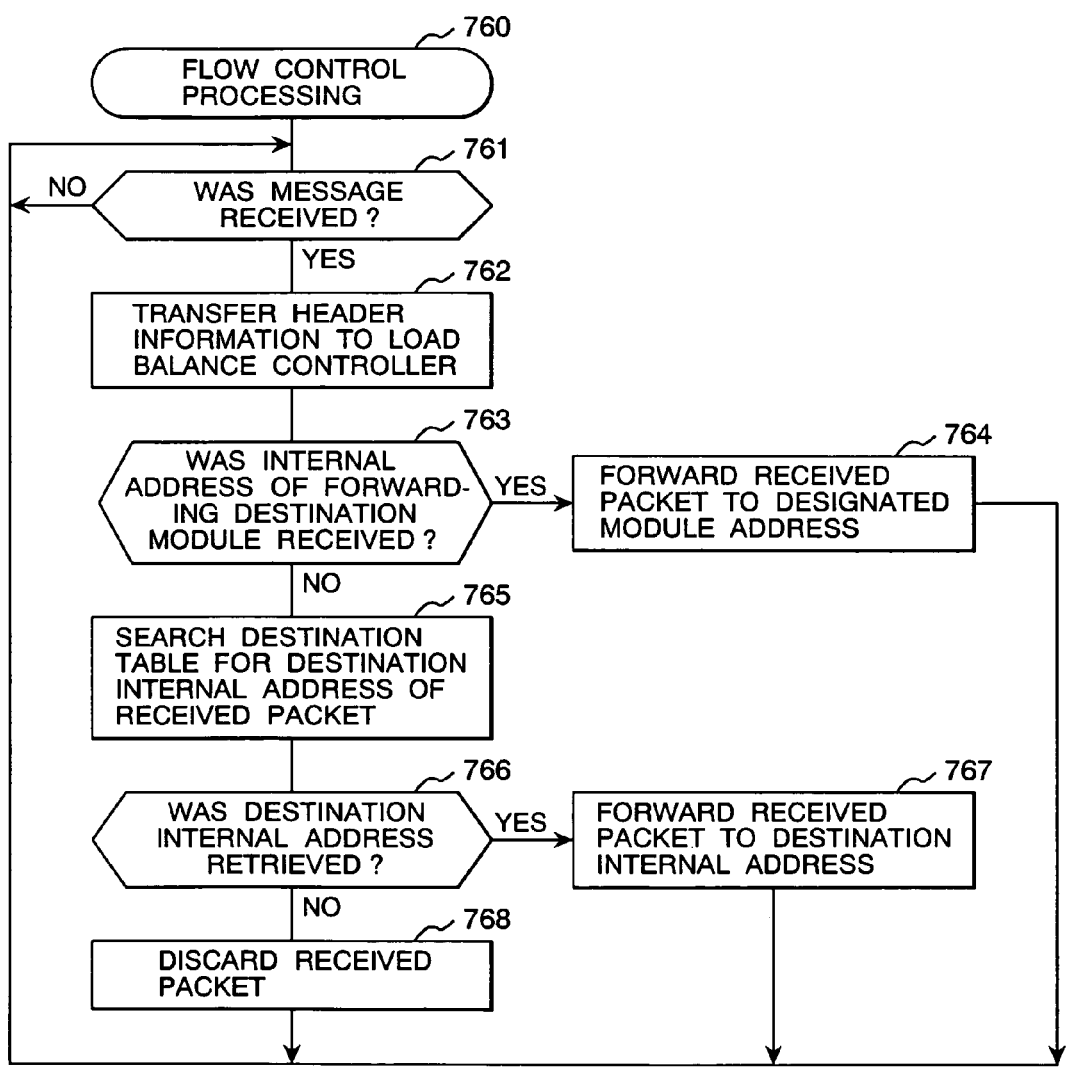
FIG. 15 is a flow chart showing one embodiment of a flow control routine 760 to be executed by the flow controllers 326 of the network interface modules 32 through 3n.
Figure 16:
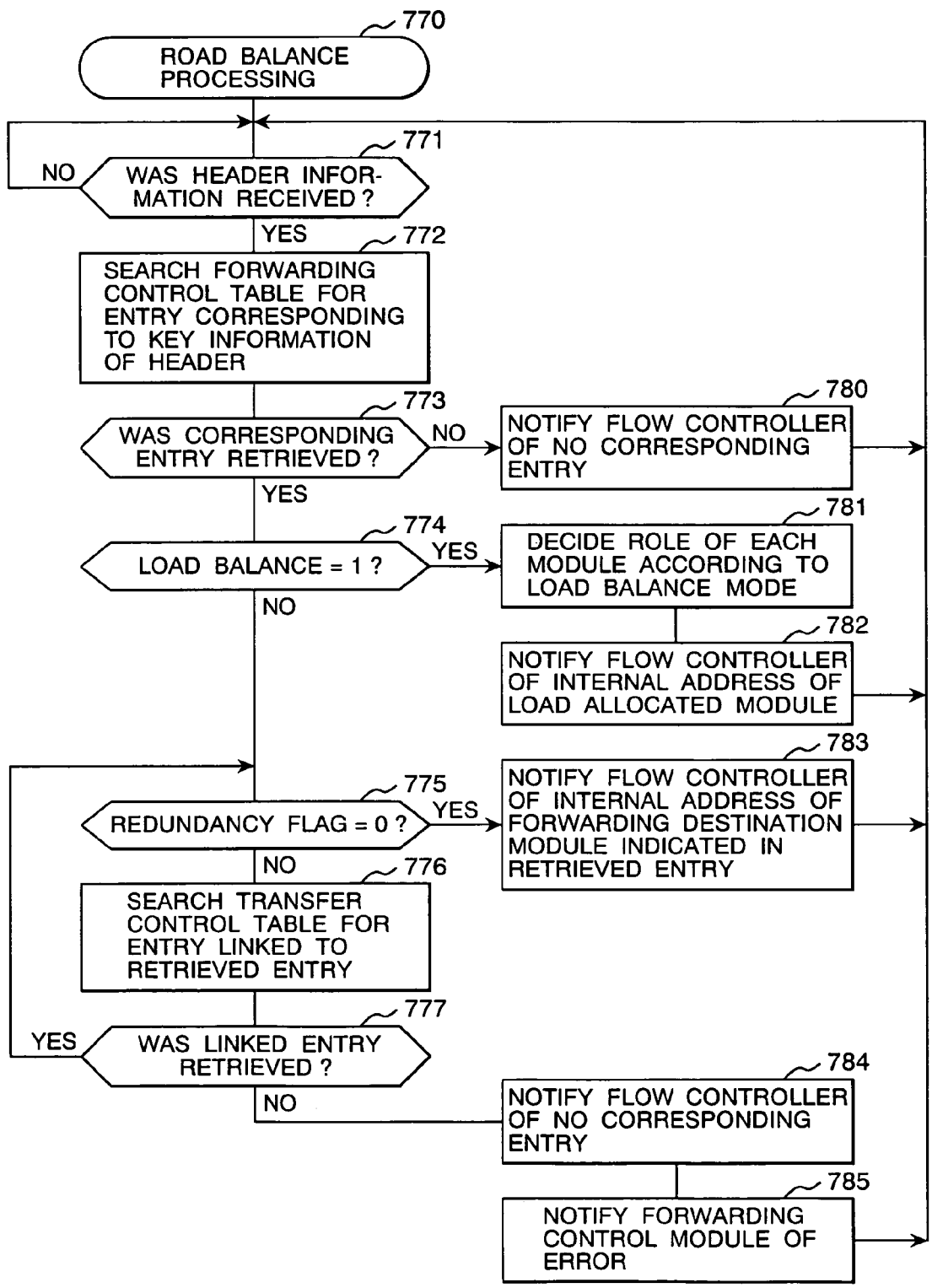
FIG. 16 is a flow chart showing one embodiment of a load balance control routine 770 to be executed by the load balance controllers 329 of the network interface modules 32 through 3n.

Next, the operations of the node apparatus to provide Web service by the extension modules 51 and 52 will be described with reference to FIG. 9 and FIG. 14 through FIG. 16. FIG. 14 is a flow chart showing one embodiment of a URL processing routine 740 to be executed by the URL judging unit 512 of the extension module 51 or 52. FIG. 15 is a flow chart showing one embodiment of a flow control routine 760 to be executed by the flow controllers 326 of the network interface modules 32 through 3n. FIG. 16 is a flow chart showing one embodiment of a load balance control routine 770 to be executed by the load balance controllers 329 of the network interface modules 32 through 3n.

Here, it is supposed that the client terminal 10 connected to the network NW1 has transmitted an IP packet including a Web content request message and addressed to the Web server 20. The Web content request packet is received by the input line interface 324 of the network interface module 32 and inputted to the flow controller 326.

As shown in FIG. 15, the flow controller 326 is waiting for reception of a packet from the input line interface 324 (761). Upon receiving a packet, the flow controller 326 notifies the header information of the received packet to the load balance controller 329 (762) and waits for a response from the load balance controller 329.

As shown in FIG. 16, the load balance controller 329 is waiting for reception of header information from the flow controller 326 (771). When header information is received, the load balance controller 329 extracts from the received header information the destination port No. (D-PORT) of the TCP header, which serves as the search key for the flow definition, and searches the forwarding control table 327 for an entry corresponding to the search key (772). If the search fails to find any entry corresponding to the search key (773), the load balance controller 329 sends a notice of the absence of any pertinent entry to the flow controller 326 (780).

If an entry matching the search key (the entry EN-1 in this case) is retrieved, the load balance controller 329 checks the load balance flag 3173 of the retrieved entry (774). If the load balance flag is "1", the load balance controller 329 determines the module to which the load (received packet) is to be allocated so that the load can be processed in proportion to the processing power of the first extension module indicated by the retrieved entry (EN-1) and that of the second extension module indicated by the entry (EN-2) linked to the retrieved entry (781), and sends the internal address 3175 of the load-allocated module to the flow controller 326 (782).

If the load balance flag is "0", the load balance controller 329 checks the redundancy flag 3174 of the retrieved entry (775). If the redundancy flag is "0", the load balance controller 329 sends the internal address 3175 of the forwarding destination module indicated in the retrieved entry to the flow controller 326 (783). If the redundancy flag is "1", the load balance controller 329 searches the forwarding control table 327 for an entry linked to the retrieved entry (776), and repeats step 775 with regard to the entry. If it is found that no entry having redundancy flag "0" is linked to the retrieved entry, the load balance controller 329 sends a notice of the absence of any pertinent entry to the flow controller 326 (784), and transmits to the control module 31 an error notice message indicating a data error in the forwarding control table (785).

When the forwarding control table 327 is in the state of FIG. 13, the load balance controller 329 computes the frequencies of the packet forwarding on the entries EN-1 and EN-2 every time a Web content request packet is received, and sends the internal address of the forwarding destination address to the flow controller 326 so that the ratio of notification frequencies between the internal addresses "P41" and "P42" is kept in 1:2.

Referring back to FIG. 15, the flow controller 326 judges the response from the load balance controller 329 (763). If the internal address of the forwarding destination module has been received, the flow controller 326 sends the received packet to the output interface 322 after adding an internal header including the internal address designated by the load balance controller (764). If the response from the load balance controller 329 does not indicate the internal address of the forwarding destination module, the flow controller 326 searches the destination table 328 for an internal address to be the destination of the received packet in accordance with the destination IP address of the received packet (765). If the internal address of the destination is retrieved, the flow controller 326 sends the received packet to the output interface 322 after adding an internal header including the retrieved internal address to the packet (767). If no destination internal address is found in the destination table 328, the flow controller 326 discards the received packet (768).

As is evident from the flow control described above, each of the network interface modules 32 through 3n selectively forwards any received packet whose header information matches a flow definition in the forwarding control table 327 to a module indicated by the internal address of the forwarding destination module in accordance with the operating mode information indicated by the table entry, and forwards received packets whose header information matches no flow definition in the forwarding control table 327 to the control module 31 or some other network interface module in accordance with the destination table.

A Web content request packet with an internal header including the internal address "P41" is forwarded by the switching unit 300 to the extension module connection interface unit 41 and outputted to the extension module 51 after eliminating the internal header by the controller 413. In the extension module 51, this Web content request packet is inputted to the flow judging unit 511. The flow judging unit 511 forwards the received packet to the URL judging unit 512 because the destination IP address of the received packet indicates the IP address "IP 20" of the Web server 20, which does not meet the condition of packet forwarding to the module controller 510.

As shown in FIG. 14, the URL judging unit 512 is waiting for reception of a packet (741). Upon receiving a packet, the URL judging unit 512 judges whether the received packet is a Web content request packet (742). If the received packet is a Web content request packet, the URL judging unit 512 checks whether the requested content is stored in the cache memory 515 as cache data (743).

If the requested content is found stored as cache data, the URL judging unit 512 read out the requested content from the cache memory, generates a Web response packet including that content and destined for the request source client terminal, and transmits the packet to the extension module connection interface 41 (744). The Web response packet is outputted to the switching unit 300 in a form of a packet with an internal header including the internal address "P32" added by the internal header adding unit 414 of the extension module connection interface 41, and transmitted to the network NW1 through the network interface module 32.

If the requested content is not stored in the cache memory 515 as cache data, the URL judging unit 512 keeps the Web request packet in the memory 516 (746), generates a Web content request packet including the IP address "IP 51" as its source address, and transmits the packet to extension module connection interface 41 (747). The TCP header of the Web content request packet includes "80" as the destination port No. (D-PORT) and "81" as the source port No. (S-PORT). The Web content request packet is supplied to the switching unit 300 through the extension module connection interface 41 in a form of a packet with an internal header including the internal address "P33" added by the internal header adding unit 414, and transmitted to the network NW2 through the network interface module 33.

Having received the Web content request packet, the Web server 20 transmits to the network NW2 a Web response packet including the requested content. The Web response packet includes "IP 51" as its destination address and "81" as the destination port No. (D-PORT) of its TCP header.

The Web response packet is received by the network interface module 33, and inputted to the flow controller 326. The flow controller 326 forwards the header information of the received Web response packet to the load balance controller 329 in accordance with the flow chart shown in FIG. 15 (step 762). The load balance controller 329 refers to the forwarding control table in accordance with the flow chart shown in FIG. 16 (step 772), but no entry having the corresponding flow definition exists in the forwarding control table because the received header information is "D-PORT: 81". Therefore, the Web response packet is not subjected to the load-balance by the network interface module 33.

Upon receiving the notification of the absence of corresponding entry from the load balance controller 329, the flow controller 326 forwards the Web response packet to the switching unit 300 in a form of a packet with an internal header including the internal address "P41" retrieved from the destination table 328. The Web response packet is supplied to the extension module connection interface unit 41 through the switching unit 300, forwarded to the extension module 51 and received by the flow judging unit 511.

Since the destination address of the received packet is "IP 51", the flow judging unit 511 outputs the packet to the module controller 510. As shown in FIG. 9, the module controller 510 is waiting for reception of the Web response packet (731). Upon receiving the Web response packet, the module controller 510 forwards the received packet to the URL judging unit 512 (733) after storing the copy of content data of the received packet in the cache memory 515 (732).

When the received packet is judged as a Web response packet (step 748 in FIG. 14), the URL judging unit 512 checks whether the Web content request packet corresponding to the Web response packet is stored in the memory 515 (749). When a corresponding Web content request packet exists, the URL judging unit 512 rewrites the destination IP header of the Web response packet with the source IP address of the Web content request packet and transmits the packet to the extension module connection interface unit 41 (750). If no Web content request packet corresponding to the Web response packet exists in the memory 515 or a packet other than a Web content request or a Web response packet was received, the URL judging unit 512 discards the received packet (751) and waits for reception of the next packet (741).

Although the foregoing description concerned the operations in the case where the network interface module 32 has forwarded the Web content request packet to the first extension module 51, it is evident that, when the Web content request packet has been forwarded to the second extension module 52 as a result of load balancing, the extension module 52 will operate similarly to the extension module 51. It is also apparent from the flow chart of FIG. 16 that, when the second extension module 52 is added as a redundant module (redundancy flag="1"), each of network interface modules will forward a received packet matching a flow definition to the first extension module 51 currently in operation (redundancy flag="0").

In the case where the second extension module 52 is added as a redundant module, the module controller 310 of the control module 31, for instance, will actuate a redundant system control routine (not shown) to transmit a diagnostic message to the extension module 51 currently in operation. When a response from the extension module 51 no longer comes, it is judged that some trouble has occurred in the extension module 51, and the standing-by extension module 52 will be instantaneously enable to operate as an active the module by rewriting the redundancy flags of the entries EN-1 and EN-2 of the forwarding control table 317.

As is evident from the foregoing embodiment, according to the invention, it is possible to provide a packet communication node apparatus that can be enabled to start a new service function promptly by plugging in an extension module. Even where a new extension module provided with the same service function as that of the extension module in operation is added, the range of service functions can be expanded in accordance with the operating mode information preset in the additional module with allowing the plurality of modules to run into inconsistency with each other.

Although the destination table 328 and the forwarding control table 327 are arranged in each individual network interface module in the embodiment, these individual tables may be omitted if each network interface module can refers to the destination table 318 and the forwarding control table 317 in the control module 31 via the signal lines L1 and L2.

Although the foregoing description of the embodiment referred to the operations of the packet communication node apparatus provided with the extension modules 51 and 52 having a Web cache service function by way of example, it is evident that the invention is applicable to the addition of an extension module having a service function other than the Web cache service. In this case, the flow definition for identifying the packet to be forwarded to the extension module may as well be expressed in a combination of a plurality of header information items that can be extracted from the header of the packet received from a network.

According to the embodiment, the control module 31 outputs a packet including an address setting message M0 to the signal line L3 when the operator inputs destination setting data, and the extension module connection interface unit 41 (42) stores the content of the address setting message M0 in the memory 415 when the internal address 601 of the received packet is identical with its own port No. Further, when the extension module 51 (52) is connected, an address setting message M1 indicating the IP address of control module and the IP address of extension module read out of the memory 415 is transmitted to the extension module.

As a variation of the invention, it is also conceivable for the control module 31 to issue the address setting message M0 to the signal line L3 when the extension module 51 (52) is connected, and for the extension module connection interface unit 41 (42) to transmit the received message M0 to the extension module as the address setting message M1. In this case, for instance, the interface unit 41 having detected the connection of the extension module 51 outputs to the signal line L3 a detection message of new extension module connection, the control module 31 reads out the destination IP address "IP 51" corresponding to the internal source address "P41" of the detection message from the destination table 318, and issues the address setting message M0 including the destination IP address and the IP address of control module to the signal line L3.

What is claimed is:

1. A modular type node apparatus for packet communication comprising:
a control module;
a plurality of network interface modules each for communicating packets with a network;
a plurality of extension module connection interface units each connectable with an extension module; and
a packet switching unit for connecting said network interface modules and said extension module connection interface units to each other and forwarding a packet received from any of said network interface modules or extension module connection interface unit to one of said network interface modules or extension module connection interface units specified by an internal address indicated in an internal header added to the received packet,
wherein each of said extension module connection interface units comprises:
a controller for transmitting, when an extension module is connected to said extension module connection interface unit, an address setting message to the extension module, the address setting message indicating a packet address of said control module and a packet address and the internal address to be allocated to the extension module; and
an internal address adding unit for outputting, upon receiving from said extension module a request packet for control data registration having a packet address destined for said control module and indicating a relationship between flow definition information for identifying a packet to be processed by the extension module and the internal address of the extension module,
the request packet to said packet switching unit in a form of an internal packet with an internal header including an internal address of said control module; connection interface units to one of said network interface modules or extension module connection interface units specified by an internal address indicated in an internal header added to the received packet,
at least one of said plurality of extension module connection interface units being connected with an extension module, wherein:
said extension module comprises:

a memory storing flow definition information for identifying a received packet to be processed by the extension module and a service identifier indicating the type of service processing to be provided by the extension module; and
a module controller having a function to issue a request packet for control data registration in its initial operation and
to execute service processing in response to reception of a packet matching the flow definition information in its steady operation;
each of said extension module connection interface units comprises:
a controller for transmitting, when an extension module is connected to said extension module connection interface unit, an address setting message to the extension module, the address setting message indicating a packet address of said control module and a packet address and the internal address to be allocated to the extension module; and
an internal address adding unit for outputting, upon receiving from said extension module a request packet for control data registration having the packet address
said control module registers, upon receiving said request packet for control data registration from said packet switching unit,
a table entry indicating the relationship between the flow definition information and the internal address of the extension module indicated in said request packet into a packet forwarding control table to be referred to by each of said network interface modules, and
each of said network interface modules outputs, upon receiving from a network a packet with header information matching the flow definition information indicated in said packet forwarding control table,
the received packet to said packet switching unit in a form of an internal packet with an internal header including the internal address corresponding to the flow definition information indicated in said packet forwarding control table.

2. The modular type node apparatus for packet communication according to claim 1, wherein the controller of each of said extension module connection interface units has a memory for storing an internal address value of the extension module connection interface unit and packet address values of said control module and an extension module notified in advance by said control module, and generates said address setting message to be transmitted to said extension module by applying said address values read out of said memory when an extension module is connected thereto.

3. The modular type node apparatus for packet communication according to claim 1, wherein the controller of each of said extension module connection interface units notifies said control module of the connection of the extension module to the extension module connection interface unit, and forwards to said extension module an address setting message indicating the packet address and the internal address received from said control module.

4. The modular type node apparatus for packet communication according to claim 1, wherein each of said network interface modules has a flow controller for referring to said packet forwarding control table when a packet was received from a network, searching a destination table, which indicates relationships between packet destination addresses and internal addresses, for an internal address to be applied to the received packet when the header information of the received packet is found not matching the flow definition information, and outputting the received packet to said switching unit in a form of an internal packet with an internal header including the internal address searched.

5. The modular type node apparatus for packet communication according to claim 4, wherein:
the request packet for control data registration received from said extension module includes information indicating the operating mode of the extension module;
said control module registers in said packet forwarding control table a table entry indicating the relationship among the flow definition information, the extension module internal address and the operating mode indicated by the request packet for control data registration; and
said flow controller of each of said network interface modules has means for judging, when a packet with header information matching the flow definition information indicated in said packet forwarding control table is received from a network, the validity of the extension module internal address indicated in a table entry including the flow definition information in accordance with the operating mode indicated in the table entry.

6. The modular type node apparatus for packet communication according to claim 5, wherein:
the request packet for control data registration received from said extension module includes an identifier of the communication service to be provided by the extension module and a load balance flag indicating whether the load should be balanced between the extension module and another extension module for providing the same service;
at least two table entries of said packet forwarding table indicate the communication service identifier and the load balance flag; and
each of said network interface modules has a load balance controller for checking, when a packet with header information matching the flow definition information indicated in a first table entry of said packet forwarding control table is received from a network, the load balance flag of the first table entry, and selecting in accordance with a predetermined algorithm, if the load balance flag indicates execution of load balancing, either an extension module internal address indicated by the first table entry or an extension module internal address indicated by a second table entry having the same service identifier as said first table entry searched from said packet forwarding control table.

7. The modular type node apparatus for packet communication according to claim 6, wherein:
the request packet for control data registration received from said extension module includes information indicating the processing power of the extension module with respect to the communication service;
each of said first and second table entries of said packet forwarding table indicates the processing power; and
said load balance controller selects the extension module internal address in accordance with the ratio of processing power between said first and second table entries.

8. A modular type node apparatus for packet communication comprising:
a control module;
a plurality of network interface modules each for communicating packets with a network;
a plurality of extension module connection interface units each connectable with an extension module; and
a packet switching unit for connecting said network interface modules and said extension module connection interface units to each other and forwarding a packet received from any of said network interface modules or extension module destined for said control module and indicating a relationship among the flow definition information, the service ID and the internal address of the extension module,
the received packet to said packet switching unit in a form of an internal packet with an internal header including an internal address of said control module;
said control module registers, upon receiving said request packet for control data registration from said packet switching unit, a table entry indicating the relationship between the flow definition information and the internal address of the extension module indicated in said request packet into a packet forwarding control table to be referred to by each of said network interface modules, and
each of said network interface modules outputs, upon receiving from a network a packet with header information matching the flow definition information indicated in said packet forwarding control table,
the received packet to said packet switching unit in a form of an internal packet with an internal header including the internal address corresponding to the flow definition information indicated in said packet forwarding control table.

9. The modular type node apparatus for packet communication according to claim 8, wherein each of said network interface modules has a flow controller for referring to said packet forwarding control table when a packet was received from a network, searching a destination table, which indicates relationships between packet destination addresses and internal addresses, for an internal address to be applied to the received packet when the header information of the received packet is found not matching the flow definition information, and outputting the received packet to said switching unit in a form of a packet with an internal header including the internal address searched.

10. The modular type node apparatus for packet communication according to claim 9, wherein:
said memory of said extension module stores flag information indicating the operating mode of the extension module,
said module controller issues, after receiving said address setting message from said extension module connection interface unit, a request packet for control data registration destined for said control module and indicating the relationship among the flow definition information, the service identifier and the operating mode information read out from said memory and the internal address of the extension module designated by the address setting message,
said control module registers in said packet forwarding control table a table entry indicating the relationship among the flow definition information, the extension module internal address and the operating mode indicated by the request packet for control data registration; and
said flow controller of each of said network interface modules has means for judging, when a packet with header information matching the flow definition information indicated in said packet forwarding control table is received from a network, the validity of the extension module internal address indicated in a table entry including the flow definition information in accordance with the operating mode indicated in the table entry.

* * * * *